United States Patent
Winstead et al.

(10) Patent No.: US 7,808,423 B2
(45) Date of Patent: Oct. 5, 2010

(54) METHODS FOR RAPID TARGET ACQUISITIONS IN RANGE MEASUREMENT SYSTEMS

(75) Inventors: Benjamin J. Winstead, Roseville, MN (US); Jason I. Formo, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 201 days.

(21) Appl. No.: 11/696,873

(22) Filed: Apr. 5, 2007

(65) Prior Publication Data

US 2008/0246648 A1 Oct. 9, 2008

(51) Int. Cl.
G01S 13/18 (2006.01)
G01S 13/08 (2006.01)
G01S 13/00 (2006.01)

(52) U.S. Cl. .............................. 342/94; 342/89; 342/91; 342/118; 342/120; 342/134; 342/175; 342/195

(58) Field of Classification Search .................... 342/89, 342/94–97, 118, 120–122, 134–145, 175, 342/192–197, 91–93, 73–81, 147–158
See application file for complete search history.

(56) References Cited

U.S. PATENT DOCUMENTS

| 3,603,995 | A | * | 9/1971 | Howard | 342/80 |
|---|---|---|---|---|---|
| 3,680,096 | A | * | 7/1972 | Bosc | 342/94 |
| 3,713,149 | A | * | 1/1973 | Bruner et al. | 342/95 |
| 3,725,935 | A | * | 4/1973 | Alpers | 342/94 |
| 3,729,737 | A | * | 4/1973 | Asam | 342/95 |
| 3,803,604 | A | * | 4/1974 | Case | 342/95 |
| 3,820,113 | A | * | 6/1974 | Gellekink et al. | 342/95 |
| 3,845,481 | A | * | 10/1974 | Danzer et al. | 342/92 |
| 3,887,917 | A | * | 6/1975 | Howard et al. | 342/95 |
| 3,918,060 | A | * | 11/1975 | Alpers | 342/97 |
| 4,008,472 | A | * | 2/1977 | Nirasawa et al. | 342/94 |
| 4,355,312 | A | * | 10/1982 | Bosi et al. | 342/94 |
| 4,649,394 | A | * | 3/1987 | Minker et al. | 342/94 |
| 4,759,373 | A | | 7/1988 | Takeuchi | |
| 4,794,543 | A | * | 12/1988 | Enein et al. | 342/94 |
| 4,809,001 | A | * | 2/1989 | Urkowitz et al. | 342/94 |
| 5,047,779 | A | | 9/1991 | Hager | |
| 5,150,125 | A | | 9/1992 | Hager | |
| 5,160,933 | A | | 11/1992 | Hager | |
| 5,387,917 | A | | 2/1995 | Hager et al. | |
| 5,572,215 | A | * | 11/1996 | Evans et al. | 342/195 |
| 5,638,076 | A | * | 6/1997 | Gravelle et al. | 342/94 |
| 7,075,478 | B2 | | 7/2006 | Hager et al. | |
| 7,098,841 | B2 | | 8/2006 | Hager et al. | |
| 7,138,940 | B2 | | 11/2006 | Hager et al. | |

* cited by examiner

*Primary Examiner*—Bernarr E Gregory
(74) *Attorney, Agent, or Firm*—Fogg & Powers LLC (57) ABSTRACT

A method for acquiring targets within a search area using an electronic device is disclosed. The method involves partitioning a first acquisition time period into a plurality of range gates, simultaneously positioning one or more of the range gates within the search area during a search mode, and transmitting an energy pulse train. Upon receipt of a reflection of the transmitted pulse train, the method records a signal level of the reflected energy pulse train within the first acquisition time period. Based on the recorded signal level, the method advances one or more of the range gates by a prescribed outbound movement increment until the signal level within at least one of the range gates is above a prescribed acquisition signal level threshold.

19 Claims, 7 Drawing Sheets

METHODS FOR RAPID TARGET ACQUISITIONS IN RANGE MEASUREMENT SYSTEMS

BACKGROUND

Reliable range measurement systems are essential for estimating position of an object in motion. For example, traditional altimeter measurements determine the altitude of the platform above a fixed level by measuring air pressure (where air pressure decreases with an increase of altitude). A radar altimeter measures altitude by using the time for energy (that is, a radar pulse) to reflect from a target back to the object. Radar altimeters are a typical embodiment of a range measurement system. As a range measurement system, the radar altimeter component informs an operator (for example, an aircraft pilot) that an aircraft is flying too low or that terrain is rising to meet the aircraft.

Typical pulsed radar systems use one or more gates to measure the reflected energy within a prescribed time period. Each gate is considered to represent a window of time in which the system monitors the reflected energy (that is, the radar altimeter begins accumulating energy at the beginning of each gate and stops accumulating this energy at the end of each gate). A typical radar altimeter device may include three gates that are in use during a track mode, of which only one is used during a search mode. Once in the search mode, a range gate is positioned at a particular location for a specified time. If the target (for example, the terrain below the aircraft) is not detected at that gate position after waiting the specified time, the range gate moves out incrementally.

Functionality of current pulsed radar altimeter devices is limited with respect to the amount of time it takes the device to acquire the target, especially at higher altitudes of 15,240 m (50,000 ft) and above. For any decreases in search response times, the range measurement system is expected to maintain current performance criteria, including measurement sensitivity and probability of detection.

SUMMARY

The following specification describes a method for rapid target acquisitions in a range measurement system. Particularly, in one embodiment, a method for acquiring targets within a search area using an electronic device is provided. The method involves partitioning a first acquisition time period into a plurality of range gates, simultaneously positioning one or more of the range gates within the search area during a search mode, and transmitting an energy pulse train. Upon receipt of a reflection of the transmitted pulse train, the method records a signal level of the reflected energy pulse train within the first acquisition time period. Based on the recorded signal level, the method advances one or more of the range gates by a prescribed outbound movement increment until the signal level within at least one of the range gates is above a prescribed acquisition signal level threshold.

DRAWINGS

These and other features, aspects, and advantages will become understood with regard to the following description, appended claims, and accompanying drawings where:

DETAILED DESCRIPTION

The following detailed description generally relates to rapid target acquisitions for range measurement systems that utilize a pulsed transmit signal waveform. Each of the rapid target acquisitions utilize a plurality of range gates that are in use during a track mode, of which one or more of the range gates are used during a search mode. Once in the search mode, the one or more range gates are positioned within a search area for a prescribed time (for example, an adjustable acquisition dwell time). If during the prescribed time, the energy within one of the range gates is found to be above a prescribed acquisition signal level threshold, the range measurement system is said to have acquired a target and transitions to a track mode. If the valid target is not acquired within the adjustable acquisition dwell time, one or more of the range gates propagate (that is, advance) by a prescribed outbound movement increment. For purposes of this description, an acquisition time period is defined as a duration of time in which all of the range gates are held in a given position to provide signal level measurement enveloped by the gate at that position.

Figure 1:
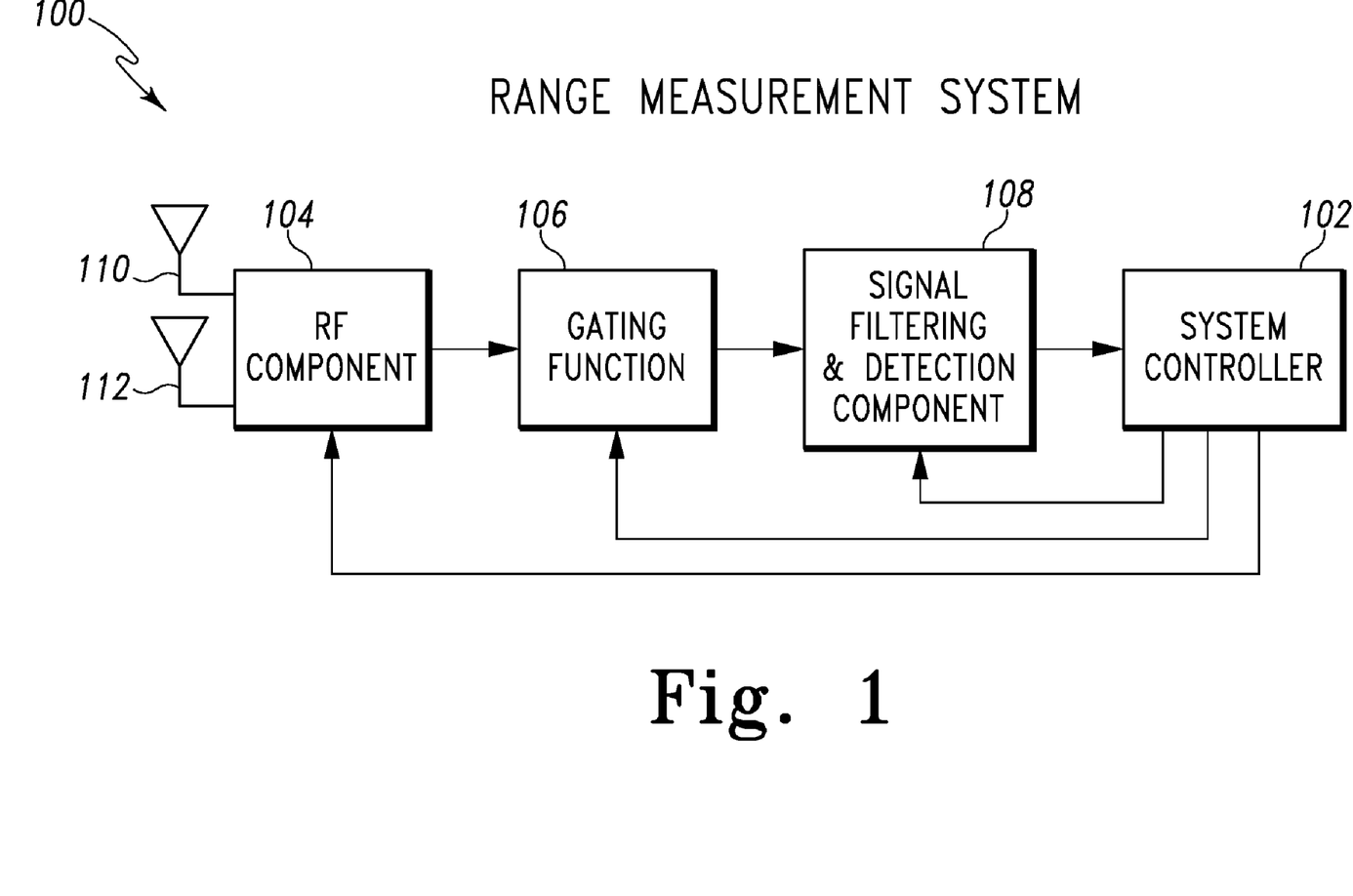
FIG. 1 is a block diagram illustrating an embodiment of an electronic range measurement system.

FIG. 1 is a block diagram illustrating an embodiment of a range measurement system 100. The system 100 comprises a system controller 102, an RF component 104, a gating function 106, and a signal filtering and detection component 108, each of which is discussed in turn below. The system controller 102 provides control signals to the RF component 104. The RF component 104 further includes a transmit antenna 110 and a receive antenna 112. In one implementation, the RF component 104 is capable of transmitting a pulse train of variable pulse width and pulse repetition interval (PRI) with the transmit antenna 110 based on the control signal provided by the system controller 102. The receive antenna 112 receives signal return pulses reflected from a (potential) target. The received signal return pulses from the RF component 104 pass through the gating function 106. According to the system controller 102, the gating function 106 passes only the signals from the RF component 104 allowed by the plurality of range gates. The gated signals pass through a signal filtering and detection component 108. The signal filtering and detection component 108 provides the system controller 102 with a measure of the signal levels present in each of the range gates.

The system controller 102 defines a plurality of range gates within a search area, as further discussed below. In the example embodiment of FIG. 1, the system controller 102 is at least one of a microcontroller, an application-specific integrated circuit (ASIC), a field-programmable gate array (FPGA), a field-programmable object array (FPOA), and a programmable logic device (PLD). Moreover, it is understood that a conversion from analog to digital range measurement signals occurs in one or more appropriate sections of the system 100. The RF component 104 includes a conversion of received return signals in a frequency range appropriate for propagation through a transmission medium (for example, in the multiple GHz range for radar systems) present between the transmit antenna 110 and the receive antenna 112 and the (potential) target to a frequency range appropriate for use in the gating function 106 and the signal filtering and detection component 108.

In operation, the system controller 102 partitions the search area into a plurality of range gates. The range measurement system 100 periodically transmits an energy pulse. Based on the search area defined by the system controller 102, the system controller 102 simultaneously positions one or more of the range gates within the search area during a search mode. In one implementation, the range measurement system 100 issues a train (that is, a periodic sequence) of the energy pulses towards the target, as further discussed below with respect to FIG. 2. The signal filtering and detection function 108 measures the reflected energy present during a prescribed acquisition dwell time for each of the range gates within the search area. The signal filtering and detection function 108 provides the measured reflected energy to the system controller 102. The system controller 102 records the levels of return signal within each of the range gates during a first acquisition time period. Based on the recorded signal level, the system controller 102 advances one or more of the range gates to one or more adjacent range positions within the search area until the signal level within one of the range gates is above a prescribed acquisition signal level threshold (that is, a target is acquired by the system 100). In the example embodiment of FIG. 1, the system controller 102 arranges one or more of the range gates (discussed in further detail below with respect to FIGS. 2 and 3) to substantially cover the search area for one or more subsequent acquisition time periods.

The system controller 102 responds to energy measured within the search area to identify the measured energy as a valid target. In one implementation, the system controller 102 propagates the one or more range gates by the prescribed outbound movement increment to extend the search area for the subsequent acquisition time periods. In at least one alternate implementation, the system controller 102 propagates a pre-charged range gate to at least a second acquisition time period by the prescribed outbound movement increment. Pre-charging of this range gate is based on the measured energy recorded from one or more of the plurality of range gates within the previous acquisition time period.

The system 100 comprises multiple range gates operating in parallel to provide rapid target acquisitions while maintaining (improving) the probability of detection of targets as the altitude increases. The rapid target acquisition method of the system 100 covers a substantially larger search area using shorter acquisition time periods. In particular, the prescribed outbound movement increment used by the system 100 is based on the number of active range gates functioning in parallel. In addition, the rapid target acquisition of the system 100 decreases the amount of transition time required from power up to normal track mode. The lower transition time provides a substantially faster acquisition time guarantee over a plurality of altitude operating ranges.

Figure 2:
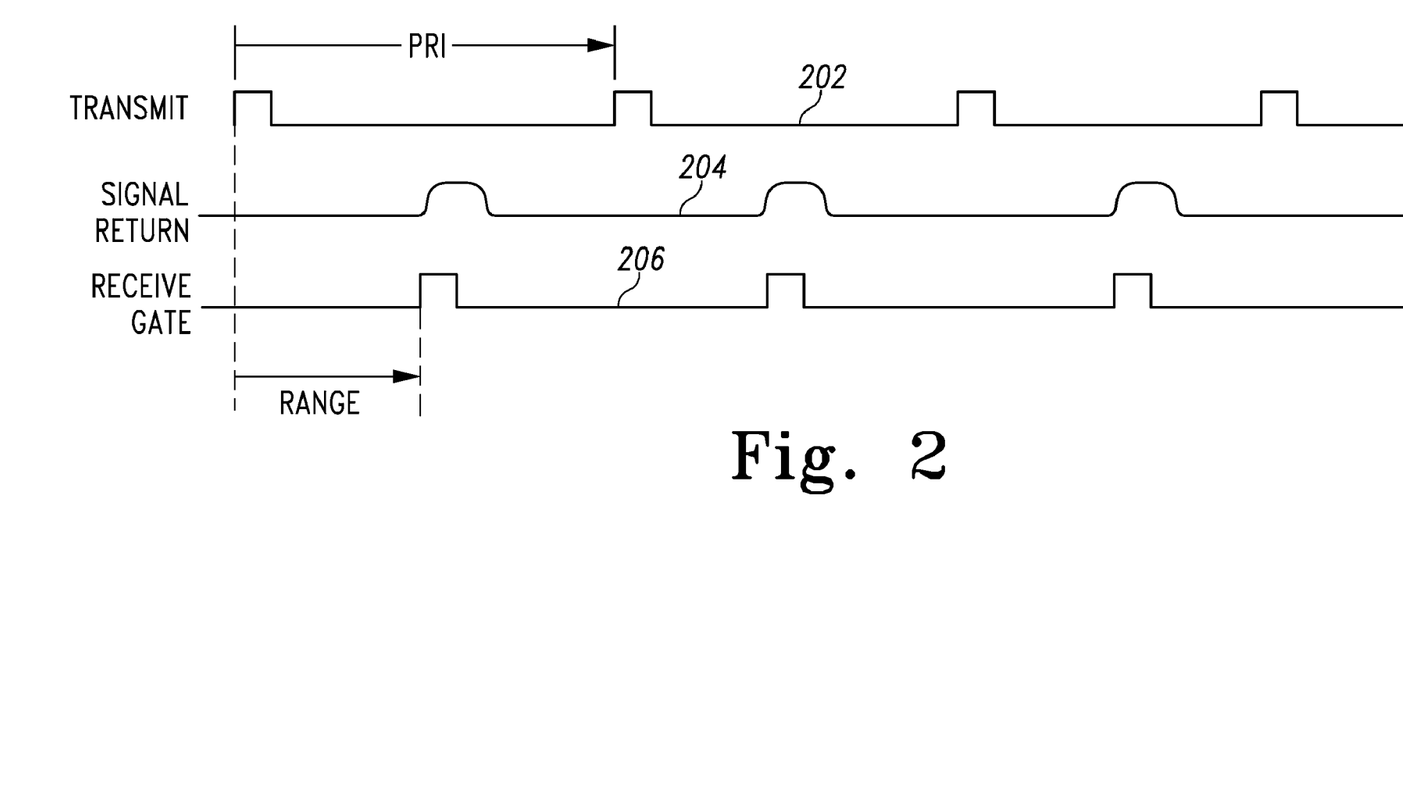
FIG. 2 is a timing diagram illustrating an embodiment of an energy pulse train from the system of FIG. 1.

FIG. 2 is a timing diagram illustrating an embodiment of a transmit pulse train series from the system 100. The transmit pulse train of FIG. 2 comprises a transmit waveform 202, a signal return waveform 204, and a receive gate waveform 206. For every recurring pulse from the transmit waveform 202 with a PRI as depicted in FIG. 2, the signal return waveform 204 indicates a corresponding signal return pulse of the energy transmitted on the pulse train of waveform 202. The corresponding signal return pulse is delayed with respect to the transmitted pulse from the transmit waveform 202 based on a range between the (potential) target and the system 100. Each of the received energy pulses on the signal return waveform 204 pass through the gating function 106 and signal filtering and detection component 108 of FIG. 1. The signal return waveform 204 is filtered by the receive gate pulses on the receive gate waveform 206. The receive gate waveform 206 passes a portion of the signal return waveform 204 associated with a range and a width of an indicated receive gate pulse. The range associated with each search range gate (for example, the range gates discussed below with respect to FIGS. 4A and 4B) is indicated in FIG. 2 as the time period between the start of each transmit pulse on the transmit waveform 202 and the start of each of the receive gate pulses on the receive gate waveform 206.

Figure 3:
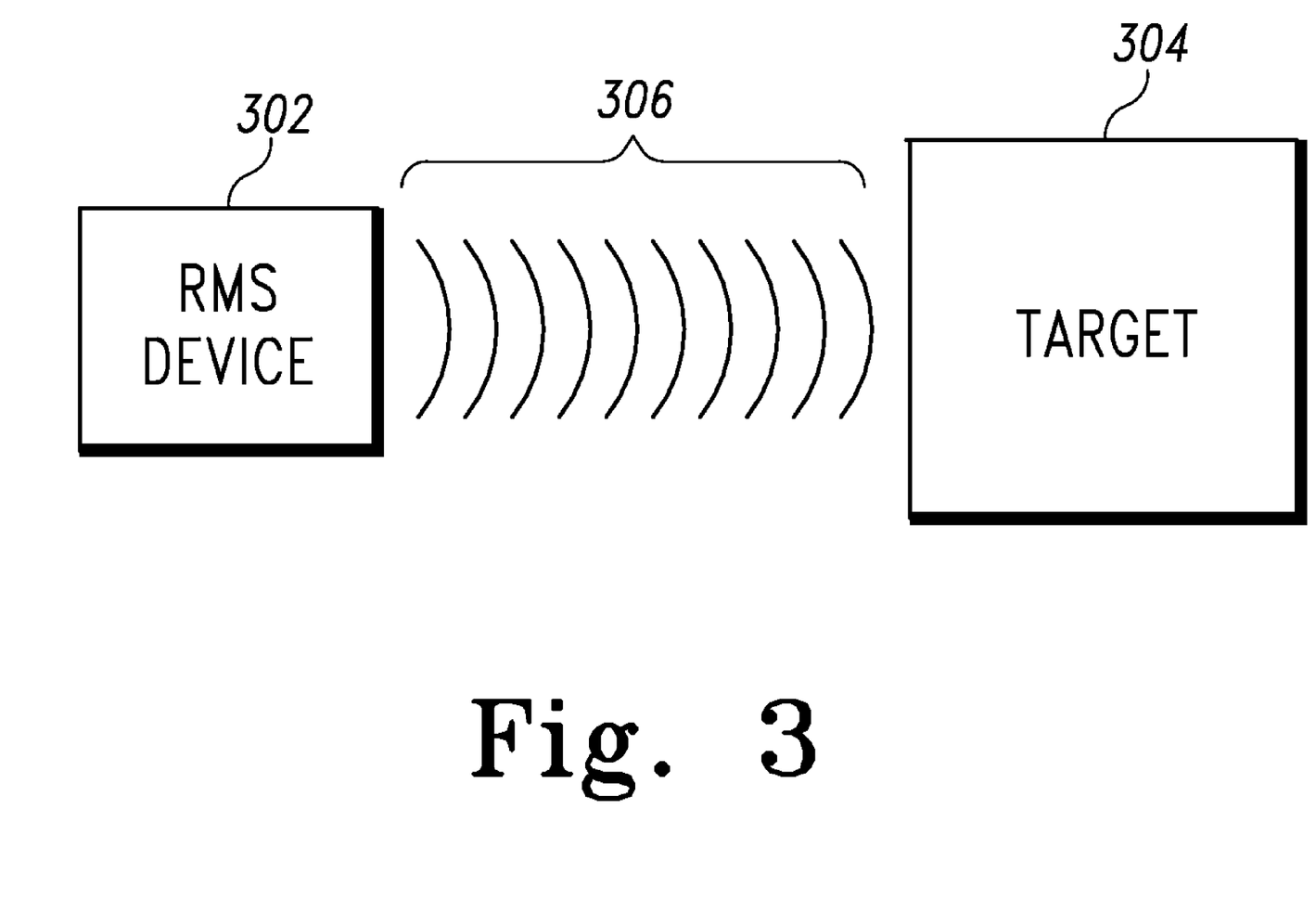
FIG. 3 is a block diagram illustrating the operation of an embodiment of the system of FIG. 1.

FIG. 3 is a block diagram illustrating the operation of an embodiment of a range measurement system (RMS) device 302 equipped with the same components as the system 100 of FIG. 1. The RMS device 302 transmits an energy pulse train 306 to a target 304 within a search area. It is understood that the target 304 is representative of any object (for example, at least one of a vehicle, an aircraft, and the Earth) capable of reflecting the energy pulse discussed above with respect to FIGS. 1 and 2. In one implementation, the target 304 is at least one of a distributed target (for example, the Earth) and a point target (for example, at least one of a vehicle and a small object) that reflects the energy pulse.

Figure 4A:
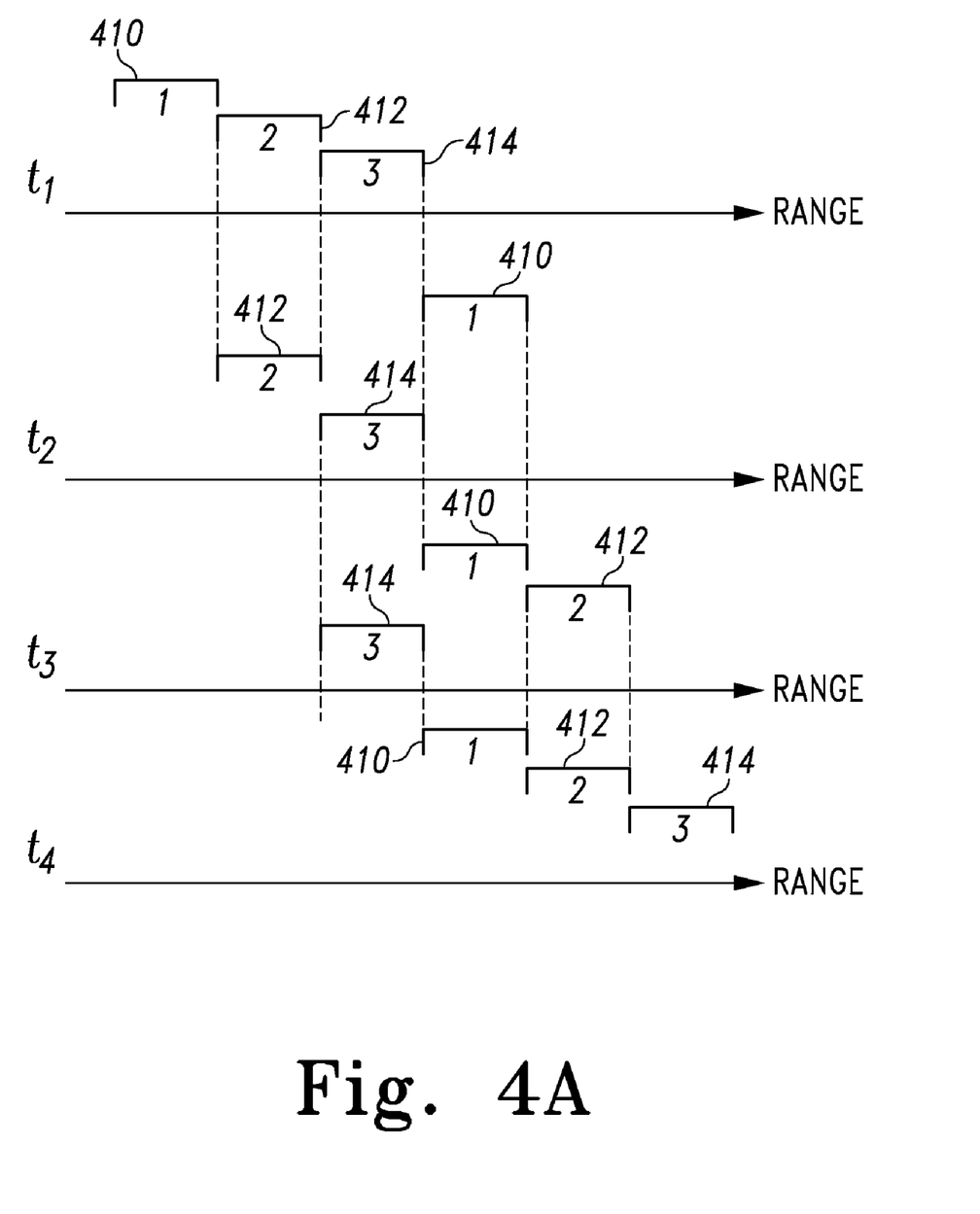
FIG. 4A is a timing diagram of the embodiment of FIG. 3.

FIG. 4A is a timing diagram for the RMS device 302 and illustrates a plurality of range gates 410 (gate 1), 412 (gate 2), and 414 (gate 3) during sequential acquisition time periods $t_1$ to $t_4$. It is understood that the RMS device 302 is capable of accommodating any appropriate number of acquisition time periods t and range gates 410, 412 and 414 (for example, one or more acquisition time periods with one or more range gates) in a single RMS device 302. Moreover, it is further understood that, in some implementations, each of the range gates 410 to 414 will (for example) overlap one another, and in at least one alternate implementation, the RMS device 302 partitions each of the range gates 410 to 414 over intermittent acquisition time periods (for example, random and non-consecutive acquisition time periods).

In operation, the RMS device 302 partitions the search area (for example, at least a portion of the area between the RMS device 302 and the target 304) during the first acquisition time period $t_1$ into the range gates 410, 412, and 414. During a search mode, the RMS device 302 arranges the range gates 410 to 414 to substantially cover the initial search area during the first acquisition time period $t_1$ for the prescribed acquisition dwell time (discussed above with respect to FIG. 1). Each of the range gates 410, 412, and 414 increments by a prescribed outbound movement increment (that is, moves out in range) from their respective positions in the search area covered during the acquisition time period $t_1$ to positions in the search area covered during the acquisition time period $t_4$. The prescribed outbound movement increment is illustrated in FIG. 4A for each of the acquisition time periods $t_1$ to $t_4$. The RMS device 302 continuously transmits the energy pulse train 306 during the time period $t_1$ to acquire the target 304. In one implementation, the RMS device 302 issues the energy pulse train 306 as a radar pulse train. As results of the energy pulse train 306 return from the target 304 during the prescribed acquisition dwell time, the RMS device 302 records the energy measured within each of the range gates 410 to 414 during each of the acquisition time periods $t_1$ to $t_4$. The RMS device 302 observes the measured energy as (potentially) the target 304 for the search time corresponding to the prescribed acquisition dwell time.

In transition from the acquisition time period $t_1$ to the acquisition time during period $t_2$, the RMS device 302 propagates the range gate 410 (gate 1) into the search area covered during the second acquisition time period $t_2$ by the prescribed outbound movement increment. In one implementation, the RMS device 302 sets the signal filters and detection components associated with gate 1 at the acquisition time period $t_2$ in the signal filtering and detection component 108 of FIG. 1 to a pre-charged energy level based on the energy levels associated with the range gate 414 measured during the acquisition time period $t_1$. In this implementation, there are three active range gates. It is understood that for similar acquisition time periods, additional (that is, one or more) active range gates are possible.

As shown in FIG. 4A, the range gate 412 (gate 2) advances by the prescribed outbound movement increment during the transition from the acquisition time period $t_2$ to the acquisition time period $t_3$. The RMS device 302 passes the accumulated measurement energy from the range gate 410 from the end of time $t_2$ as a starting point for the filters associated with the range gate 412 at the beginning of time $t_3$. Once the target 304 is acquired, the RMS device 302 enters a track mode. The RMS device 302 enters the track mode in response to finding the energy within at least one of the range gates 410 to 414 to be above a prescribed acquisition signal level threshold. The RMS device 302 continues to increment one or more of the range gates 410 to 414 through the search range until a target (similar to the target 304) is acquired.

Figure 4B:
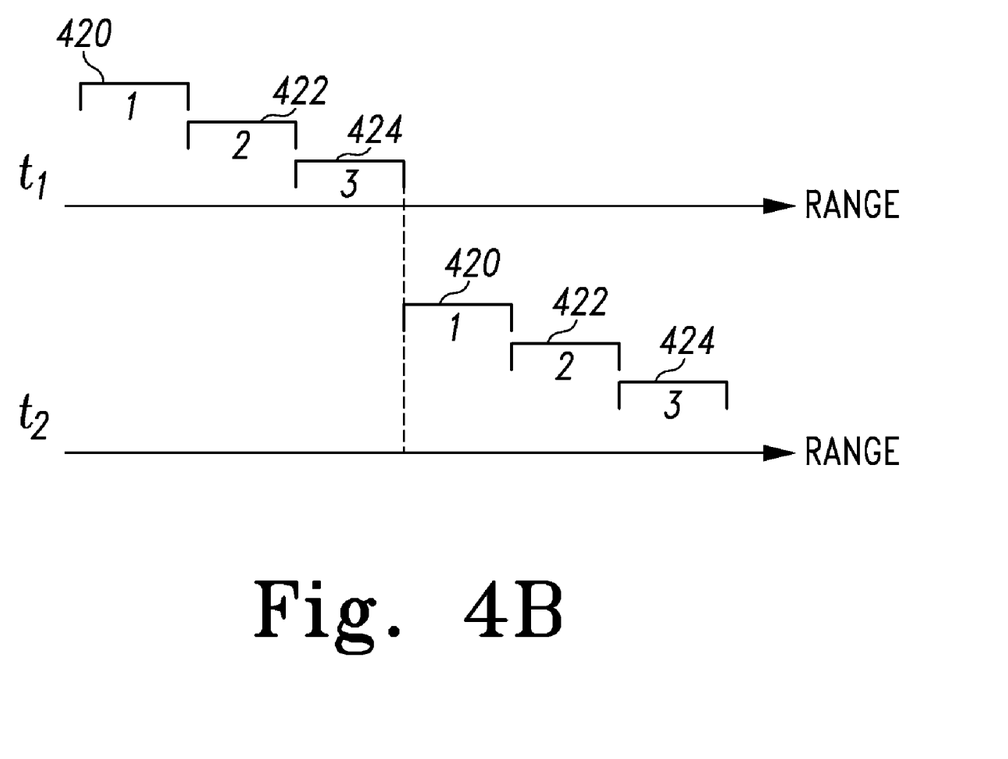
FIG. 4B is an alternate timing diagram of the embodiment of FIG. 3.

FIG. 4B is an alternate timing diagram for the RMS device 302. FIG. 4B comprises a plurality of range gates 420 (gate 1), 422 (gate 2), and 424 (gate 3) within a search area (for example, at least a portion of the area between the RMS device 302 and the target 304) during acquisition time periods $t_1$ and $t_2$. It is understood that for FIG. 4B, the RMS device 302 is capable of accommodating any appropriate number of acquisition time periods $t_1$ and $t_2$ and range gates 420 to 424 (for example, one or more acquisition time periods with one or more range gates) in a single RMS device 302. Moreover, it is further understood that, in some implementations, each of the range gates 420 to 424 will (for example) overlap one another, and in at least one alternate implementation, the RMS device 302 partitions each of the range gates 420 to 424 over intermittent acquisition time periods (for example, random and non-consecutive acquisition time periods).

In operation, the RMS device 302 partitions the search area during the first acquisition time period $t_1$ into the range gates 420, 422, and 424. During a search mode, the RMS device 302 arranges the range gates 420 to 424 to substantially cover the initial search area during the first acquisition time period $t_1$ for the prescribed acquisition dwell time (discussed above with respect to FIG. 1). Each of the range gates 420, 422, and 424 increments by a prescribed outbound movement increment (that is, move out in range) between the first acquisition time period $t_1$ and the second acquisition time period $t_2$. The prescribed outbound movement increment is illustrated in FIG. 4B for each acquisition time period $t_1$ and $t_2$. The RMS device 302 propagates the range gates 420 to 424 into the search area being measured during the second acquisition time period $t_2$ by the prescribed outbound movement increment. The RMS device 302 increments the range gates 420 to 424 in parallel to cover the search area being measured during the second acquisition time period $t_2$. Similar to FIG. 4A, the RMS device 302 enters the track mode in response to finding the energy in at least one of the range gates 420 to 424 to be above the prescribed acquisition signal level threshold. It is understood that the RMS device 302 continues to advance the range gates 420, 422, and 424 in parallel until the target 304 is acquired.

Figure 5:
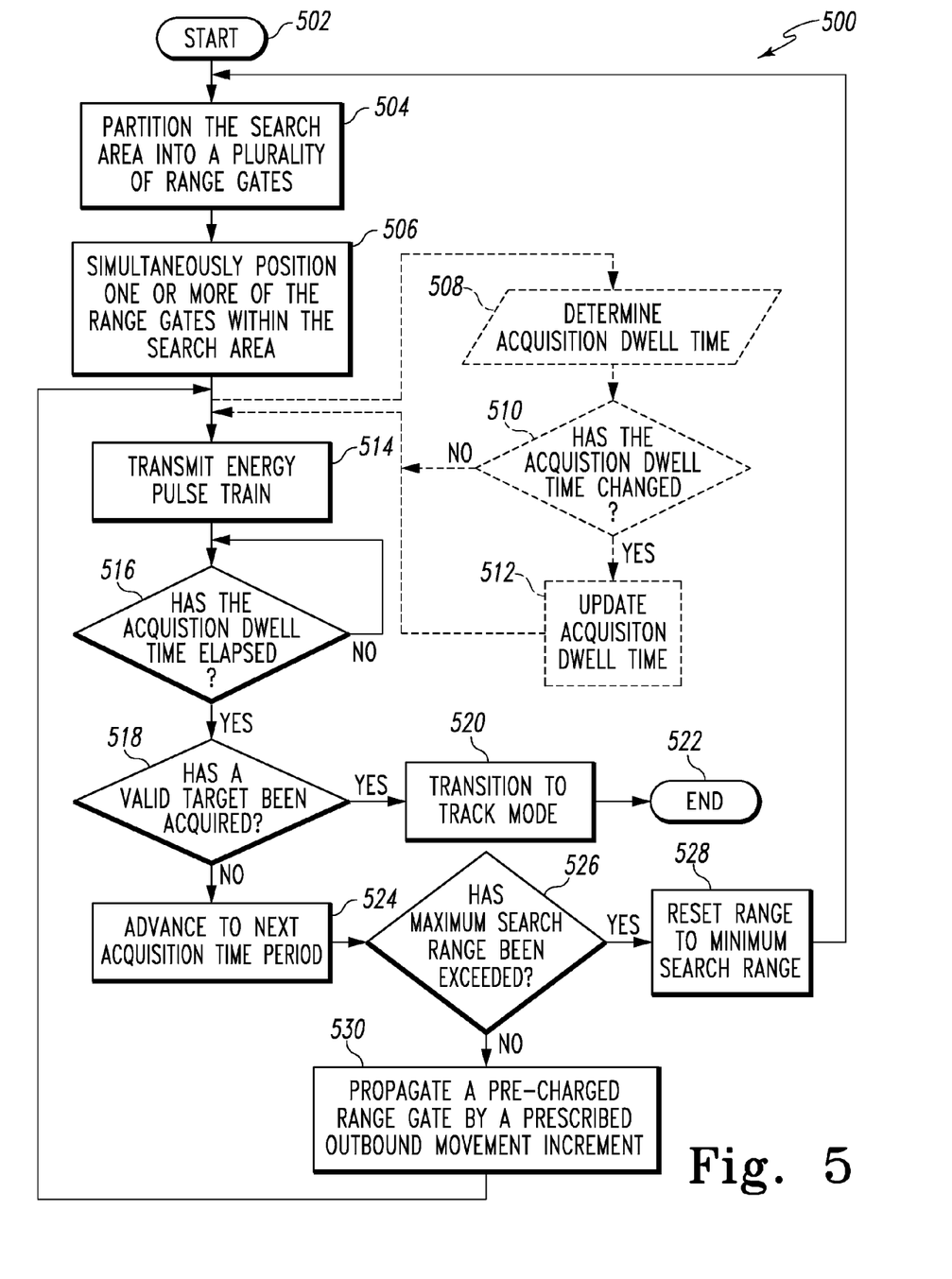
FIG. 5 is a flow diagram illustrating an embodiment of a method used by the device of FIG. 3.

FIG. 5 is a flow diagram illustrating a method 500 for acquiring targets within a search area using the RMS device 302. The method 500 begins at block 502. FIG. 5 addresses partitioning the search area into a plurality of range gates (for example, the range gates 410 to 414 of FIG. 4A), simultaneously positioning one or more of the range gates within the search area for a first acquisition time period, and based on a signal level of a reflected energy pulse train recorded at an (optional) adjustable acquisition dwell time corresponding to the first acquisition time period, advancing one or more of the range gates until a target (for example, the target 304) is acquired.

At block 504, the RMS device 302 partitions the search area into the range gates 410 to 414. At block 506, the RMS device 302 simultaneously positions the range gates 410 to 414 within the search area during the first acquisition time period (for example, time period $t_1$). In one implementation, (optional) block 508 determines an acquisition dwell time. At (optional) block 510, if the acquisition dwell time has not changed, the method 500 continues at block 514. If the acquisition dwell time has changed (optional block 512), the system controller 102 is updated with the acquisition dwell time. In one or more alternate implementations, the acquisition dwell time is configured at a constant rate, and the method 500 continues at block 514.

The RMS device 302 transmits the energy pulse train into the search area at block 514. Once the acquisition dwell time elapses (block 516), the RMS device 302 observes the energy level detected within the search area to determine if the target 304 has been acquired (block 518). Until the target 304 is acquired, the RMS device 302 remains in a search mode and advances to at least a second acquisition time period (for example, the acquisition time period $t_2$) at block 524. Once the target 304 is acquired, the RMS device 302 transitions to a track mode at block 520.

Until a prescribed maximum search range is exceeded (block 526), the RMS device 302 propagates the range gate 410 (for example) based on the prescribed outbound movement increment (discussed above with respect to FIG. 4A) at block 530. Propagating at least one range gate (similar to the range gate 410) by the prescribed outbound movement increment substantially increases the probability of acquiring the target 304 as the RMS device 302 increases in altitude. Once the prescribed maximum search range is exceeded, the search range is reset to a prescribed minimum search range at block 528, and the method 500 returns to block 504.

Figure 6:
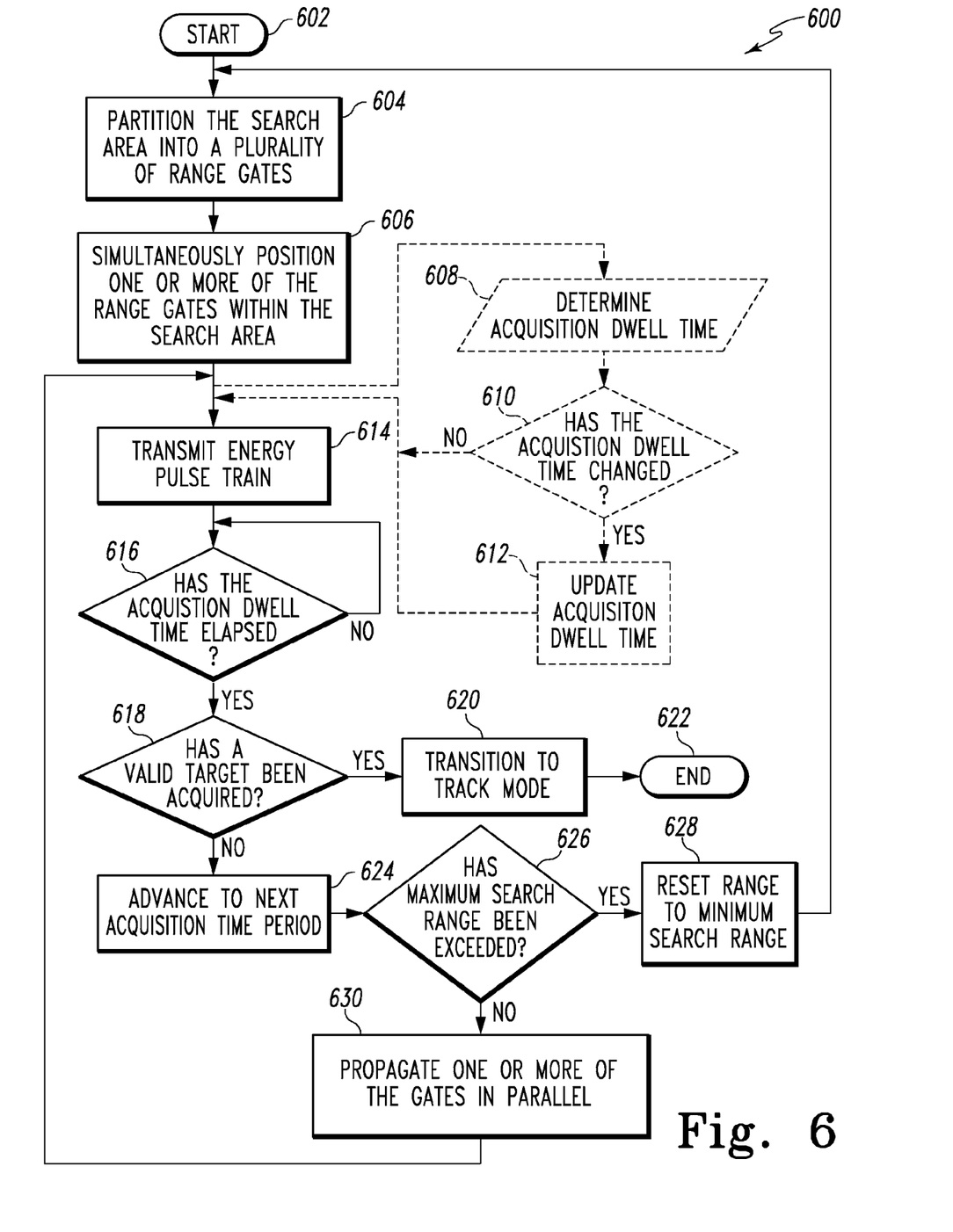
FIG. 6 is a flow diagram illustrating an embodiment of an alternate method used by the device of FIG. 3.

FIG. 6 is a flow diagram illustrating an alternate method 600 for acquiring targets using the RMS device 302. The method of FIG. 6 begins at block 602. Similar to the method of FIG. 5, the method of FIG. 6 addresses partitioning the search area into a plurality of range gates (for example, the range gates 420 to 424 of FIG. 4B), simultaneously positioning one or more of the range gates within the search area for a first acquisition time period, and based on a signal level of a reflected energy pulse train recorded at an (optional) adjustable acquisition dwell time corresponding to the first acquisition time period, advancing one or more of the range gates until each target (for example, the target 304) is acquired.

At block 604, the RMS device 302 partitions the search area into the range gates 420 to 424. At block 606, the RMS device 302 simultaneously positions the range gates 420 to 424 within the search area during the first acquisition time period (for example, time period $t_1$). In one implementation, (optional) block 608 determines an acquisition dwell time. At (optional) block 610, if the acquisition dwell time has not changed, the method 600 continues at block 614. If the acquisition dwell time has changed (optional block 612), the system controller 102 is updated with the acquisition dwell time.

In one or more alternate implementations, the acquisition dwell time is configured at a constant rate, and the method 600 continues at block 614.

The RMS device 302 transmits the energy pulse train into the search area at block 614. Once the acquisition dwell time elapses (block 616), the RMS device 302 observes the energy level detected within the search area to determine if the target 304 has been acquired (block 618). Until the target 304 is acquired, the RMS device 302 remains in a search mode and increments to at least a second acquisition time period (for example, the acquisition time period $t_2$) at block 624. Once the target 304 is acquired, the RMS device 302 transitions to a track mode at block 620.

Until a prescribed maximum search range is exceeded (block 626), the RMS device 302 propagates the range gates 420 to 424 in parallel (that is, simultaneously) by the prescribed outbound movement increment at block 630. Propagating the range gates 420 to 424 in parallel by the prescribed outbound movement increment substantially increases the probability of acquiring the target 304 as the RMS device 302 increases in altitude. Once the prescribed maximum search range is exceeded, the search range is reset to a prescribed minimum search range at block 628, and the method 600 returns to block 604.

The methods and techniques described herein may be implemented in a combination of digital electronic circuitry and software (or firmware) residing in a programmable processor (for example, a general-purpose processor in a computer). An apparatus embodying these techniques may include appropriate input and output devices, a programmable processor, and a storage medium tangibly embodying program instructions for execution by the programmable processor. A process embodying these techniques may be performed by a programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, a processor will receive instructions and data from at least one of a read only memory (ROM) and a random access memory (RAM). Storage media suitable for tangibly embodying computer program instructions and data include all forms of non-volatile memory, and include by way of example, semiconductor memory devices; ROM and flash memory devices; magnetic disks such as internal hard disks and removable disks; magneto-optical disks; optical disks such as compact disks (CDs), digital video disks (DVDs), and other computer-readable media. Any of the foregoing may be supplemented by, or incorporated in, specially-designed application-specific integrated circuits (ASICs).

This description has been presented for purposes of illustration, and is not intended to be exhaustive or limited to the embodiments disclosed. While the teachings of the present application has been described in terms of various specific embodiments, those skilled in the art will recognize that modifications may occur which fall within the scope of the following claims.

What is claimed is:

1. A method for acquiring targets within a search area, the method comprising:
   partitioning a first acquisition time period into a plurality of range gates;
   simultaneously positioning one or more of the range gates within the search area during a search mode;
   transmitting a radar pulse train into the search area;
   upon receipt of a reflection of the transmitted radar pulse train from a target, recording a signal level of the reflected radar pulse train within the first acquisition time period; and
   based on the recorded signal level, advancing one or more of the range gates by a prescribed outbound movement increment to extend the search area for subsequent acquisition time periods until the signal level within at least one of the range gates is above a prescribed acquisition signal level threshold.

2. The method of claim 1, wherein simultaneously positioning one or more of the range gates comprises arranging the one or more range gates to substantially cover the search area for the first acquisition time period.

3. The method of claim 1, wherein transmitting the radar pulse train comprises observing an RF energy level detected within the search area.

4. The method of claim 1, wherein recording the signal level of the reflected radar pulse train comprises responding to RF energy measured within the first acquisition time period at an adjustable acquisition dwell time.

5. The method of claim 4, wherein responding to the RF energy measured comprises detecting the measured RF energy as a valid target for a prescribed search time corresponding to the adjustable acquisition dwell time.

6. The method of claim 1, wherein advancing one or more of the range gates comprises propagating the one or more range gates in parallel.

7. The method of claim 1, wherein advancing one or more of the range gates comprises propagating a pre-charged range gate to extend the search area for at least a second acquisition time period by the prescribed outbound movement increment at the transition between acquisition time periods.

8. A method of acquiring a target within a search area using a radar device, the method comprising:
   partitioning a first acquisition time period into a plurality of range gates;
   simultaneously positioning one or more of the range gates within the search area during a search mode;
   transmitting a radar pulse train into the search area;
   as the radar device records a signal level within the first acquisition time period:
      searching for the target at an adjustable acquisition dwell time during the search mode, the adjustable acquisition dwell time corresponding to the first acquisition time period; and
      arranging one or more of the range gates within the search area to substantially cover the search area for the first acquisition time period; and
   based on the recorded signal level, advancing one or more of the range gates by a prescribed outbound movement increment to extend the search area for subsequent acquisition time periods until the signal level within the search area is above a prescribed acquisition signal level threshold.

9. The method of claim 8, wherein transmitting the radar pulse train comprises issuing a series of radar pulses from the radar device into the search area.

10. The method of claim 8, wherein advancing one or more of the range gates comprises propagating the one or more range gates in parallel.

11. The method of claim 8, wherein advancing one or more of the range gates comprises propagating a pre-charged range gate to extend the search area for at least a second acquisition time period by the prescribed outbound movement increment.

12. A radar system, comprising:
a system controller;
an RF component in operative communication with the system controller, the RF component comprising a plurality of transmit pulse widths and periods;
a gating component coupled to the RF component and the system controller, the gating component passing only signals received from the RF component and allowed by a plurality of range gates;
a signal filter and detection component coupled to the gating component and in operative communication with the system controller; and
wherein the system controller comprises program instructions that are operable to:
    partition a search area into the plurality of range gates; and
    during a search mode for a target that covers the search area over one or more acquisition time periods:
        transmit, from the RF component, a radar pulse train into the search area;
        simultaneously position one or more of the range gates for an acquisition dwell time of each of the acquisition time periods;
        measure, with the signal filter and detection component, a reflection of the transmitted radar pulse train for the acquisition dwell time; and
        based on the measured amount of radar pulse energy reflected during the acquisition dwell time, advance one or more of the range gates by a prescribed outbound movement increment to extend the search area for each of the acquisition time periods until the target is acquired.

13. The system of claim 12, wherein the system controller is at least one of a microcontroller, an application-specific integrated circuit, a field-programmable gate array, a field-programmable object array, and a programmable logic device.

14. The system of claim 12, wherein the acquisition dwell time is adjustable.

15. The system of claim 12, wherein the program instructions that partition the search area into the plurality of range gates cause the system controller to arrange one or more of the range gates to substantially cover the search area for each of the acquisition time periods.

16. The system of claim 12, wherein the program instructions that transmit the radar pulse train cause the system controller to observe an RF energy level detected within the search area.

17. The system of claim 16, wherein the program instructions that simultaneously position each of the one or more range gates cause the system controller to:
    respond to the radar pulse energy measured within at least one of the range gates at the acquisition dwell time; and
    track the measured radar pulse energy during the search mode until the measured radar pulse energy within the at least one of the range gates is above a prescribed acquisition signal level threshold.

18. The system of claim 12, wherein the program instructions that advance each of the one or more range gates cause the system controller to propagate the one or more range gates in parallel.

19. The system of claim 12, wherein the program instructions that advance each of the one or more range gates cause the system controller to propagate a pre-charged range gate through each of the acquisition time periods by the prescribed outbound movement increment.

* * * * *